United States Patent [19]

Isono et al.

[11] Patent Number: 5,689,299

[45] Date of Patent: Nov. 18, 1997

[54] PICTURE DISTRIBUTION METHOD AND DEVICE COMPRISING COPYING OF PICTURE INFORMATION FROM A FIRST FILE TO PLURAL SECOND FILES

[75] Inventors: Osamu Isono; Tsudoi Kubo, both of Kawasaki, Japan

[73] Assignee: Fujitsu Limited, Kanagawa, Japan

[21] Appl. No.: 763,822

[22] Filed: Dec. 11, 1996

Related U.S. Application Data

[63] Continuation of Ser. No. 271,196, Jul. 7, 1994, abandoned.

[30] Foreign Application Priority Data

Dec. 22, 1993 [JP] Japan .................................. 5-324469

[51] Int. Cl.$^6$ ................................................. H04N 7/173
[52] U.S. Cl. ............................ 348/7; 348/12; 455/4.2
[58] Field of Search .................................. 348/7, 8, 6, 12, 348/13, 14, 15, 16, 17, 18; 455/4.2, 5.1, 6.1; H04N 7/16, 7/173

[56] References Cited

U.S. PATENT DOCUMENTS

| | | | |
|---|---|---|---|
| 4,538,176 | 8/1985 | Nakajima et al. | 348/7 |
| 5,133,079 | 7/1992 | Ballantyne et al. | 348/7 |
| 5,172,413 | 12/1992 | Bradley et al. | 348/7 |
| 5,371,532 | 12/1994 | Gelman et al. | 348/7 |
| 5,421,031 | 5/1995 | De Bey | 348/12 |
| 5,442,390 | 8/1995 | Hooper et al. | 348/12 |

*Primary Examiner*—John K. Peng
*Assistant Examiner*—Chris Grant
*Attorney, Agent, or Firm*—Helfgott & Karas, PC.

[57] ABSTRACT

In a picture distribution method and device, a picture supply device is connected to a network and serves to supply prescribed picture sources to plural subscriber terminals through the network. The picture sources can be supplied to any subscriber terminal just when a supply demand for a picture source is made from the subscriber terminal, and a single picture source can be supplied to a large number of subscribers with a simple control operation. The picture supply device includes a first file for storing the picture sources, plural second files for temporarily storing the picture sources, a copying unit for copying any picture source in the first file into the second files, and a read-out unit provided for each second file for reading out the picture source stored in the second file. A transmitting unit is provided for transmitting the output line of the read-out unit to the subscriber circuit connected to the subscriber terminal to transmit the picture source to the subscriber terminal. An analyzer analyzes the picture-source supply demand from the subscriber terminal to perform identification of an address in the first file for the picture source, identification of an empty second file and identification of the subscriber circuit connected to the subscriber terminal.

6 Claims, 12 Drawing Sheets

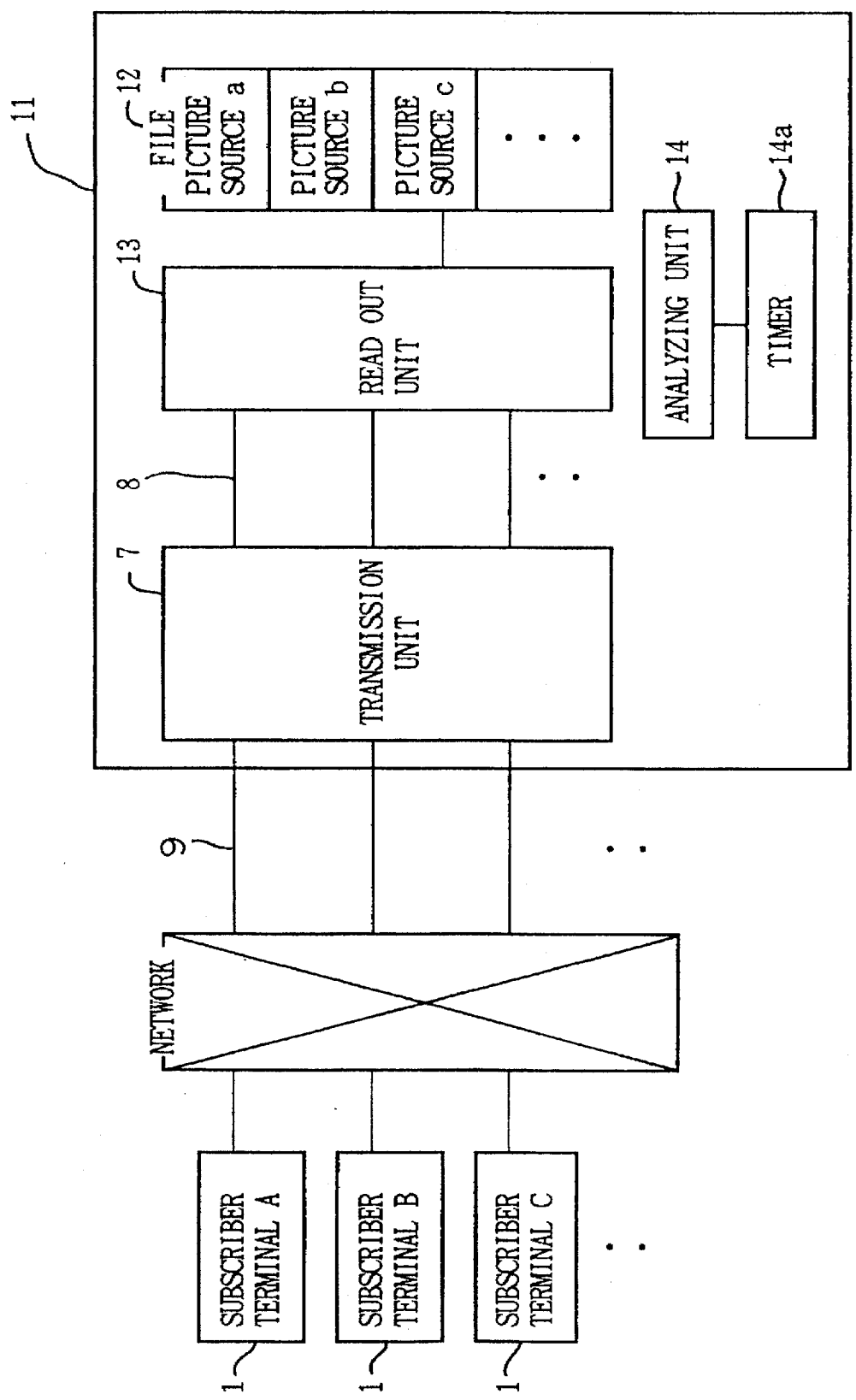
F I G. 2

PICTURE DISTRIBUTION METHOD AND DEVICE COMPRISING COPYING OF PICTURE INFORMATION FROM A FIRST FILE TO PLURAL SECOND FILES

This is a continuation of application Ser. No. 08/271,196, filed Jul. 7, 1994 now abandoned.

BACKGROUND OF THE INVENTION (1) Field of the Invention

This invention relates to picture distribution method and device for distributing/providing information such as video (picture) data, audio data, etc. to plural subscribers through a communication network.

(2) Description of Related Art

Communication networks such as ISDN, ATM, etc. for collectively handling video (picture) data, audio data, data, etc. have been recently developed. Through the development of the communication networks, a communication service utilizing ISDN or ATM has been also promoted to be developed.

As one method of providing the communication service has been known a point-to-point type of communication service in which a single subscriber is connected to another single subscriber. Further, there has been also considered a broad casting type of communication service in which a single subscriber is connected to plural subscribers to effectively provide the same communication service to a larger number of subscribers.

In order to realize the service providing method of broad casting type using ISDN or ATM, a system for distributing picture information such as movies, music, articles, pictures, etc. to plural subscribers, a cable television distribution system, etc. have been proposed.

FIG. 12 shows a video data distribution system which is realized with B-ISDN.

This system includes a center 200 having plural picture sources, a plurality of subscriber terminals 100 which are connected to the center 200 through a B-ISDN network.

The center 200 includes a file 203 in which the plural picture sources are stored, a read-out device 202 for reading out picture sources desired by subscribers from the file 203, a picture distributing device 204 for copying and distributing the picture sources read out by the read-out device 202, and a transmission and reception device for transmitting each picture source distributed by the picture distributing device 204 to each subscriber through a communication station 210.

On the other hand, the subscriber terminal 100 includes a display device for displaying video data transmitted from the center 200, and a speaker for outputting audio data transmitted from the center 200.

When a subscriber desires a communication service, the subscriber accesses the center 200 through the subscriber terminal 100, and transmits a picture-source supply demand to the center 200. The transmission and reception device 201 of the center 200 receives the picture-source supply demand from the subscriber terminal 100, and then notifies the read-out device 202 of the picture-source supply demand.

The read-out device 202 analyzes the picture-source supply demand to identify a picture source desired by the subscriber and detect the file address for the picture source. Thereafter, the read-out device 202 accesses the file address of the file 203 to read out video data stored at the file address, and outputs the picture source to the picture distributing device 204.

When the picture source is provided to a single subscriber terminal 100, that is, when only one subscriber desires the picture source, the picture distributing device 204 transmits directly to the transmission and reception device 201 the video data which are transmitted from the read-out device 202.

On the other hand, when the picture source is provided to plural subscriber terminals 100, that is, when plural subscribers desire the picture source at the same time, the picture distributing device 204 copies the video data to form video data (picture sources) whose number is equal to the number of the subscribers who desire the picture source. Thereafter, the picture distributing device 204 transmits the plural picture sources thus formed to the transmission and reception device 201. The transmission and reception device 201 adds destination information to each picture data, and transmits it to the communication station 210. The communication station 210 transmits each picture video to the subscriber terminal 100 on the basis of the destination information of each video data.

Accordingly, the subscribers can see desired picture sources at home without going to shops to buy picture sources or to make a rental.

However, the above system has the following problem. For example, a picture source a is being transmitted to a subscriber A, and during this transmission operation, another subscriber B requires the picture source a. In this case, the picture source a cannot be provided to the subscriber B until the transmission of the picture source a to the subscriber A is completed. Therefore, in some cases, a picture source cannot be provided to a subscriber at a time desired by the subscriber.

Further, the number of the read-out devices of the center restricts the number of subscribers who can be connected to the center.

Still further, when a single picture source is distributed to plural subscribers, the number of subscribers to which the picture source can be distributed is dependent on the hardware construction of the picture distributing device, so that in order to distribute a larger number of subscribers, the construction of the device must be designed in larger scale, and more complicated control is required.

On the other hand, it may be useful that with respect to popular picture sources, plural sources are beforehand stored in the file. However, in this case the same kind of picture sources occupy at a file area, and thus the number of the kinds of picture sources is reduced. Therefore, this method has low efficiency.

SUMMARY OF THE INVENTION

An object of this invention is to provide a picture distributing method and device in which a standby time required to subscribers can be reduced, and a larger number of subscribers can access in a simple construction.

Another object of this invention is to provide a picture distributing method and device capable of distributing a single picture source to a large number of subscribers in a simple control operation.

This invention will be briefly described below.

(1) First Picture distributing Method

According to the first picture distributing method of this invention, a picture supply device for providing a picture source which is desired by a subscriber is connected to a network. The picture supply device includes a first file for storing plural kinds of picture sources, and plural second files for temporarily storing picture sources.

Further, plural communication lines are connected across the picture supply device and the network, and these communication lines are referred to as subscriber circuits.

When a picture source supply demand is made from a single subscriber terminal, the picture supply device of this invention executes an address identification step for identifying an address of the first file for a picture source desired by the subscriber terminal. Thereafter, it executes a second file identification step for identifying an empty second file from the plural second files, and then executes a subscriber circuit identification step for identifying a subscriber circuit which is connected to the above subscriber terminal in the plural subscriber circuits.

Subsequently, the picture supply device accesses the first file, and executes a copying step for copying a picture source stored at the address identified at the address identification step to the second file which is identified at the second file identification step. Thereafter, the picture supply device successively executes a read-out step for reading out the picture source written into the second file at the copying step, and a transmission step for outputting the picture source read out at the read-out step to the subscriber circuit which is identified at the subscriber circuit identification step.

As described above, according to the picture providing method of this invention, when a picture-source supply demand is made from a single subscriber, a picture source desired by the subscriber is read out from the first file, and but it is not directly transmitted. The picture source in the first file is temporarily copied to the second file, and the picture source copied in the second file is transmitted to the subscriber terminal. That is, even when a supply demand for a picture source A is made from a subscriber terminal b during transmission of the picture source a to another subscriber terminal a, the picture source A is copied to any one of empty second files other than the second file which is used to provide the picture source a to the subscriber terminal a, whereby the picture source A can be provided from the second file to the subscriber terminal b. Accordingly, the other subscriber terminal b can be provided with the picture source A without waiting for the completion of the transmission of the picture source A to the subscriber terminal a.

Further, when the supply demand for the same picture source is made from plural subscriber terminals at the same time, the picture source copied in the second file is distributed to picture sources whose number is equal to the number of the subscriber terminals desiring the picture source, and these distributed picture sources are transmitted to the respective subscriber circuits connected to the subscriber terminals. Therefore, the picture source can be effectively provided to the plural subscriber terminals at the same time.

(2) Second Picture distributing Method

According to the second picture distributing method of this invention, the picture supply device is connected to a network, and it includes a file for storing plural kinds of picture sources.

When a supply demand for a picture source is made from a subscriber terminal, the picture supply device executes a time count starting step for starting a time count operation of a specific time, and at the same time executes an address identification step for identifying an address in a file of a picture source which is desired by a subscriber terminal. Subsequently, the picture supply device executes a subscriber circuit identification step for identifying a subscriber circuit connected to the subscriber terminal, and it is on standby until the time count operation of the specific time is completed. Upon completion of the time count of the specific time, the picture supply device successively executes a read-out step for reading out the picture source stored at the address identified at the address identification step, and a transmission step for transmitting the picture source read out at the read-out step to the subscriber circuit which is identified at the subscriber circuit identification step.

According to the second picture distributing method, when the same picture source as the subscriber terminal is required by another subscriber terminal within a specific time, the picture supply device executes the step for identifying the subscriber circuit connected to the other subscriber terminal. Thereafter, at the transmission step, the picture source is transmitted to the subscriber circuit connected to the subscriber terminal and the subscriber circuit connected to the other subscriber terminal.

As described above, according to the second picture distributing method, plural picture-source supply demands can be received within the specific time, and the standby time of each subscriber terminal can be reduced to its minimum value.

Further, the specific time is preferably set every individual picture source. In this case, the individual specific time may be altered in accordance with the frequency of the supply demand for the picture source. The longest specific time is set for the alterable range of the specific time.

In a case where the second picture information providing method is used, a charge for each subscriber terminal is preferably determined in accordance with a standby time when the subscriber terminal waits from the transmission of a picture supply demand to the start of reception of a picture source. That is, a low charge is imposed on a subscriber terminal waiting for a longer time than a subscriber terminal waiting for a shorter time.

(3) First Picture distributing Device

According to the first picture distributing device, a picture distributing device for providing picture sources to plural subscriber terminals is connected to a network. The picture supply device and the network are connected to each other through plural subscriber circuits. The subscriber circuits are communication lines through which video signals, audio signals, data signals, etc. can be communicated.

Further, the picture supply device includes a first file for storing plural kinds of picture sources, and plural second files for temporarily storing picture sources read out from the first file. The picture providing source has analyzing means for analyzing the picture source supply demand from the subscriber terminal to identify an address in the first file of the picture source demanded by the subscriber terminal, identify an empty second file in the plural second files, and identify a subscriber circuit connected to the subscriber terminal in the plural subscriber circuits. Further, the picture supply device includes copying means for copying a picture source demanded by a subscriber terminal from the first file to the second file, read-out means which is provided to each second file and serves to read out from the second file a picture source which is copied by the copying means, and transmission means for transmitting the picture source read out by the read-out means to the subscriber terminal.

When receiving the picture-source supply demand from the subscriber terminal, the picture supply device starts the analyzing means. The analyzing means analyzes the picture source supply demand to carry out identification of an address in the first file of the picture source demanded by the subscriber terminal, identification of an empty second file in the plural second files and identification of a subscriber circuit connected to the subscriber terminal. Subsequently, the analyzing means notifies the copying means of the address of the picture source and the empty second file, and notifies the transmitting means of the subscriber circuit.

The copying means copies the picture source stored at the address identified by the analyzing means to the empty second file.

The read-out means of the second file reads out the picture source copied in the second file.

The transmitting means connects the subscriber circuit identified by the analyzing means to the output line of the read-out means to transmit to the subscriber terminal the picture source which is read out by the read-out means.

The transmitting means has a function of distributing a single picture source to plural subscriber circuits. For example, when the transmitting means receives the supply demand for the same picture source from plural subscriber terminals at the same time, the transmitting means connects the subscriber circuits connected to the respective subscriber terminals to the output line of the read-out means to transmit the picture source read out by the read-out means to the respective subscriber terminals. In a case where the supply demand for a specific picture source is made from subscriber terminals whose number is above (N+1) although the transmitting means is allowed to connect a single output line to subscriber circuits whose number is equal to N, the copying means identifies two empty files, and copies the picture source into the two second files. Through this operation, the picture source can be distributed to subscriber terminals whose maximum number is (2N+1). Further, in a case where the supply demand is made from subscriber terminals whose number is above 2N+1, the copying means identifies three empty second files. The allocation of the second files as described above is determined on the basis of the number of supply demands. With this operation, the distribution and transmission of a single source to subscriber terminals of {(number of second files)×N} can be performed. In this embodiment, the files are designed in a double-layer structure comprising first and second files, however, a hierarchical structure comprising three or more layers may be adopted if occasion demands.

When the picture supply device receives a supply demand for a picture source A from another subscriber terminal b during transmission of the picture source A to a subscriber terminal a, the picture supply device actuates the analyzing means to carry out the identification of the address of the picture source A, the identification of an empty second file other than the second file which is used for the transmission to the subscriber terminal a, and the identification of the subscriber circuit connected to the subscriber terminal b. Further, the copying means copies the picture source A stored at the address of the first file to the second file. Subsequently, the read-out means of the second file reads out the picture source copied in the second file. Further, the transmitting means connects the subscriber circuit connected to the subscriber terminal b to the output line of the read-out means, and transmits the picture source A to the subscriber terminal b. As described above, when the supply demand for the picture source A is made during the transmission of the picture source A, the picture supply device can provide the picture source A without keeping the demanding subscriber terminal waiting. In other words, the subscriber terminal b can obtain the picture source A with no standby time even when the picture source A is transmitted to another subscriber a.

BRIEF DESCRIPTION OF THE DRAWINGS

FIG. 2 is a schematic view showing a picture distributing device of an embodiment 2;

DETAILED DESCRIPTION OF THE PREFERRED EMBODIMENTS

Preferred embodiments according to this invention will be described hereunder with reference to the accompanying drawings.

EMBODIMENT 1

Figure 1:
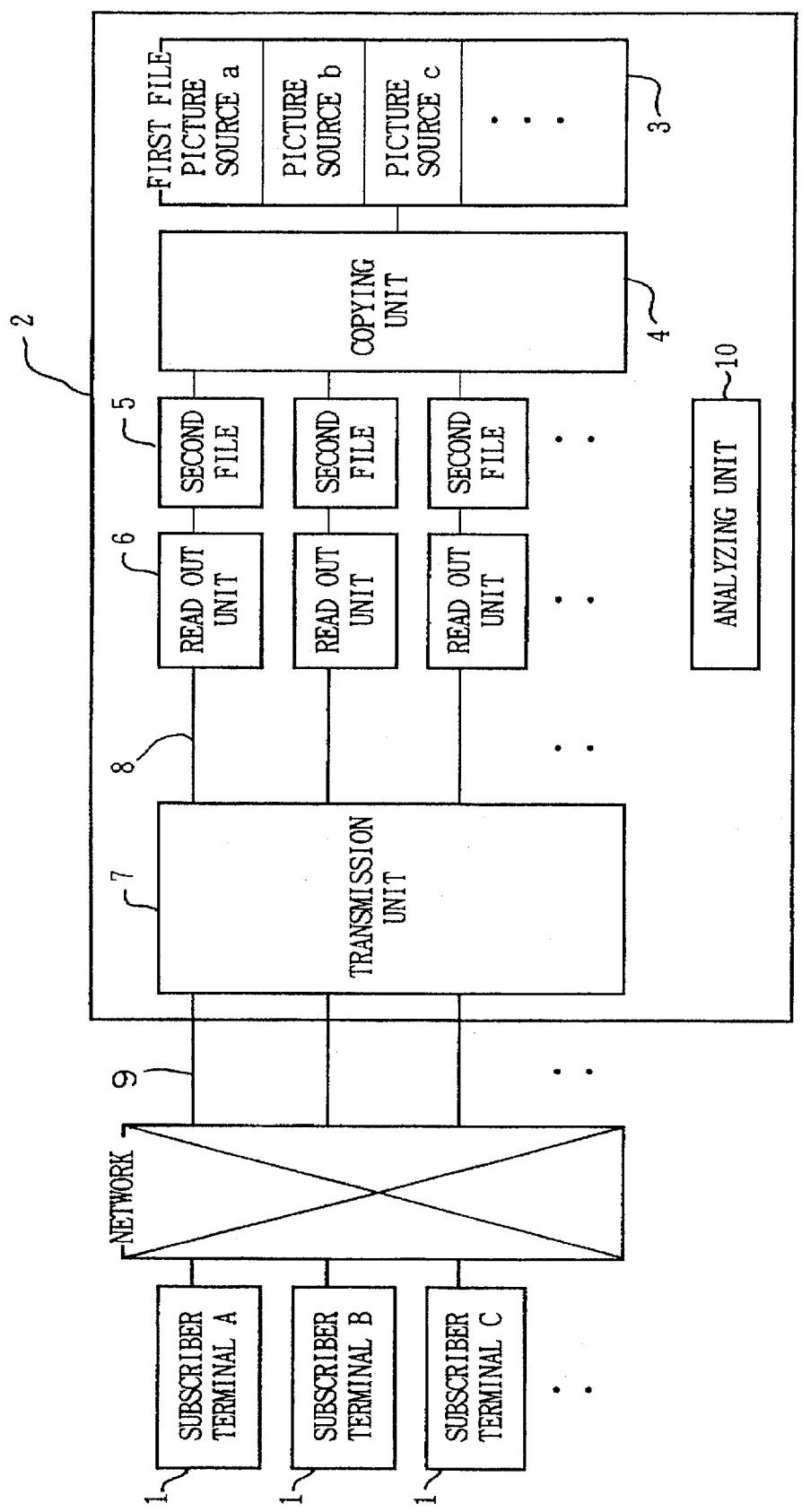
FIG. 1 is a schematic view showing a picture distributing device of an embodiment 1.

A picture distributing device of an embodiment 1 according to this invention will be described with reference to FIG. 1.

The picture distributing device is designed so that a picture supply device is connected to a network. The picture supply device and the network are connected to each other through plural subscriber circuits 9. These subscriber circuits 9 are communication lines through which digital video signals, audio signals or data signals can be transmitted.

The picture supply device includes a single first file 3, plural second files 5, a read-out unit 6 which is provided to each second file 5, an analyzing unit 10, a copying unit 4 and a transmitting unit 7. The first file 3 serves to store plural kinds of picture sources therein. Each second files 5 serves to temporarily store a picture source which is read out from the first file 3.

The analyzing unit 10 has a function of identifying an address in the first file 3 for a picture source A which is demanded by a subscriber terminal, a function of identifying an empty second file 5, and a function of identifying a subscriber circuit 9 which is connected to the subscriber terminal.

The copying unit 4 serves to copy the picture source stored at the address identified by the analyzing unit 10 to the empty second file 5. Each read-out unit 6 has a function of reading out the picture source copied into the second file 5. The transmission unit 7 is provided between an output line 8 and the subscriber circuit 9, and serves to connect the subscriber circuit 9 identified by the analyzing unit 10 to the output line 8 of the read-out portion 6.

The operation flow of the picture supply device will be described below.

The picture supply device actuates the analyzing unit 10 when receiving a supply demand from subscriber terminal. The analyzing unit 10 analyzes the picture-source supply demand to perform the identification of the address in the first file 3 of the picture source demanded by the subscriber terminal, the identification of the empty second file 5, and the identification of the subscriber circuit 9 connected to the subscriber terminal. The analyzing unit 10 notifies the copying unit 4 of the address of the picture source and the empty second file 5, and notifies the transmission unit 7 of the subscriber circuit 9.

The copying unit 4 accesses the first file 3 on the basis of the address notified from the analyzing unit 10 to read out the picture source demanded by the subscriber terminal. The copying unit 4 writes the picture source read out from the first file 3 into the second file 5 identified by the analyzing unit 10.

Thereafter, the read-out unit 6 of the second file 5 reads out the picture source copied into the second file 5. Further, the transmission unit 7 connects the subscriber circuit 9 identified by the analyzing unit 10 to the output line 8 of the read-out unit 6 to transmit the picture source read out from the read-out unit 6 to the subscriber terminal.

When receiving the supply demands for the same picture source from plural subscriber terminals at the same time, the picture supply device actuates the analyzing unit 10. The analyzing unit 10 performs the identification of the address of the picture source, the identification of empty second files 5 and the identification of the subscriber circuits 9 connected to the respective subscriber terminal.

The copying unit 4 reads out the picture source at the address which is identified by the analyzing unit 10 and writes it into the empty second files 5. The read-out units 6 of the second files 5 read out the picture source copied into the second files 5. The transmission unit 7 connects the plural subscriber circuits 9 identified by the analyzing unit 10 to the output lines 8 of the read-out units 6 to distribute and transmit the picture source read out from the read-out units 6 to each subscriber terminal.

Further, when the picture supply device receives a supply demand for a prescribed picture source A from another subscriber terminal b during transmitting the picture source A to a subscriber terminal a, the picture supply device actuates the analyzing unit 10. The analyzing unit 10 thus actuated performs the identification of the address in the first file 3 for the picture source A, the identification of an empty second file 5 other than the second file 5 which is used to transmit the picture source A to the subscriber terminal a, and the identification of the subscriber circuit 9 connected to the subscriber terminal b.

The copying unit 4 identifies the address in the first file 3 for the picture source A, and at the same time identifies an empty second file 5 in the second files 5 to copy the picture source stored at the address into the second file 5. Thereafter, the read-out unit 6 reads out the picture source copied in the second file 5, and the transmission unit 7 connects the subscriber circuit 9 analyzed by the analyzing unit 10 to the output line 8 of the read-out unit 6. Through this operation, the picture source A read out from the read-out unit 6 can be transmitted to the subscriber terminal a.

EMBODIMENT 2

The picture distributing device of an embodiment 2 will be described with reference to FIG. 2.

Like the embodiment 1, the picture distributing device is designed so that a picture supply device 11 is connected to a network.

The picture supply device 11 has a file 12, a timer 14a, an analyzing unit 14, a read-out unit 13 and a transmission unit 7. The file 12 serves to store plural kinds of picture sources therein, and the timer 14a serves to start a time count operation of a specific time from the instantaneous time when a picture-source supply demand is received.

The analyzing unit 14 performs the identification of the address in the file 12 for a picture source demanded by a subscriber terminal, and the identification of a subscriber circuit 9 connected to the subscriber terminal.

The read-out unit 13 serves to read out the picture source stored at the address which is identified by the analyzing unit 14 when the time count operation of the timer 14a is completed. The transmission unit 7 serves to connect the output line 8 of the read-out unit to the subscriber circuit 9 which is identified by the analyzing unit 14 to transmit the picture source read out by the read-out unit 13 to the subscriber terminal.

Next, the operation of the picture supply device will be described below.

When receiving a picture-source supply demand from a subscriber terminal 1, the picture supply device 11 actuates the analyzing unit 14. The analyzing unit 14 actuates the timer 14a, and at the same time analyzes the picture-source supply demand to perform the identification of an address in the file 12 for the picture source demanded by the subscriber terminal 1 and the identification of a subscriber circuit 9 connected to the subscriber terminal 1. Subsequently, the analyzing unit 14 notifies the read-out unit 13 of the address for the picture source and notifies the transmission unit 7 of the subscriber circuit 9.

When the timer 14a completes its count operation of the specific time, the read-out unit 13 is actuated to read out the picture source at the address identified by the analyzing unit 14. Thereafter, the transmission unit 7 connects the subscriber circuit 9 identified by the analyzing unit 14 to the output line of the read-out unit 13 and transmit the picture source read out by the read-out unit 13 to the subscriber terminal 1.

Further, when receiving a supply demand for the picture source as described above from another subscriber terminal within the specific time, the analyzing unit 14 identifies the subscriber circuit 9 connected to the other subscriber terminal 1 and notifies the transmission unit 7 of it. After the specific time elapses, the read-out unit 13 reads out the picture source at the address which is identified by the analyzing unit 14.

On the other hand, the transmission unit 7 connects both of the subscriber circuit 9 connected to the subscriber terminal 1 and the subscriber circuit 9 connected to the other subscriber terminal 1 to the output lines 8 of the read-out unit 13, and then transmit the picture source read out by the read-out unit 13 to the respective subscriber terminals 1.

EMBODIMENT 3

Figure 3:
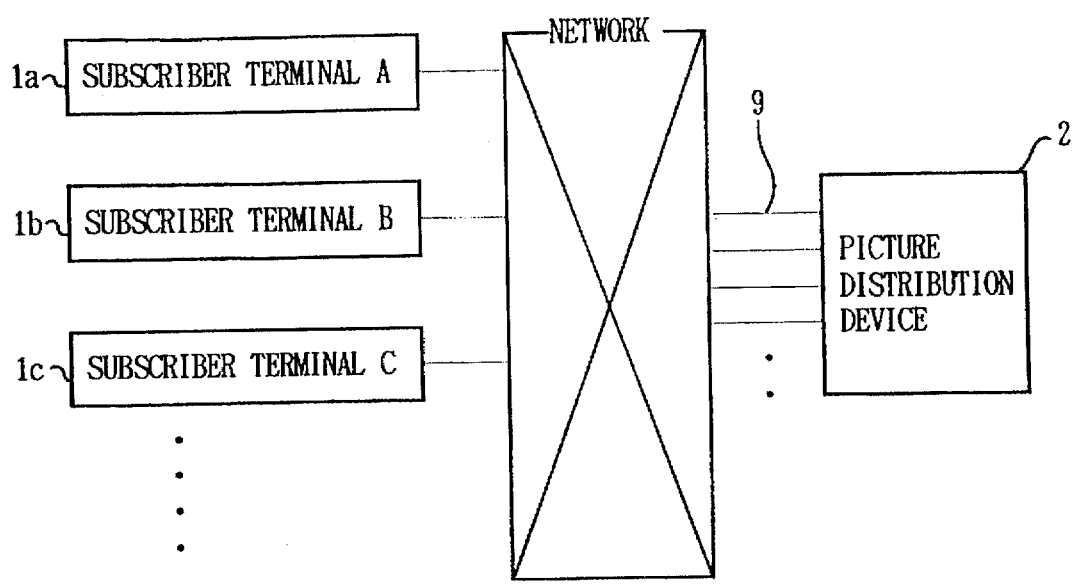
FIG. 3 is a schematic view showing a picture distributing system of an embodiment 3.

FIG. 3 is a schematic view showing a picture distributing system of an embodiment 3.

In the embodiment 3, a picture supply device 2 is connected to a network which accommodates a subscriber terminal (A)1a, a subscriber terminal (B) 1b and a subscriber terminal (C) 1c (these terminals are hereinafter commonly referred to as "subscriber terminal 1"). The network and the picture supply device 2 are connected to each other through plural subscriber circuits 9. The picture supply device 2 of this embodiment stores various kinds of picture sources such as movies, music, etc., and serves to transmit these picture sources to each subscriber terminal 1.

Figure 4:
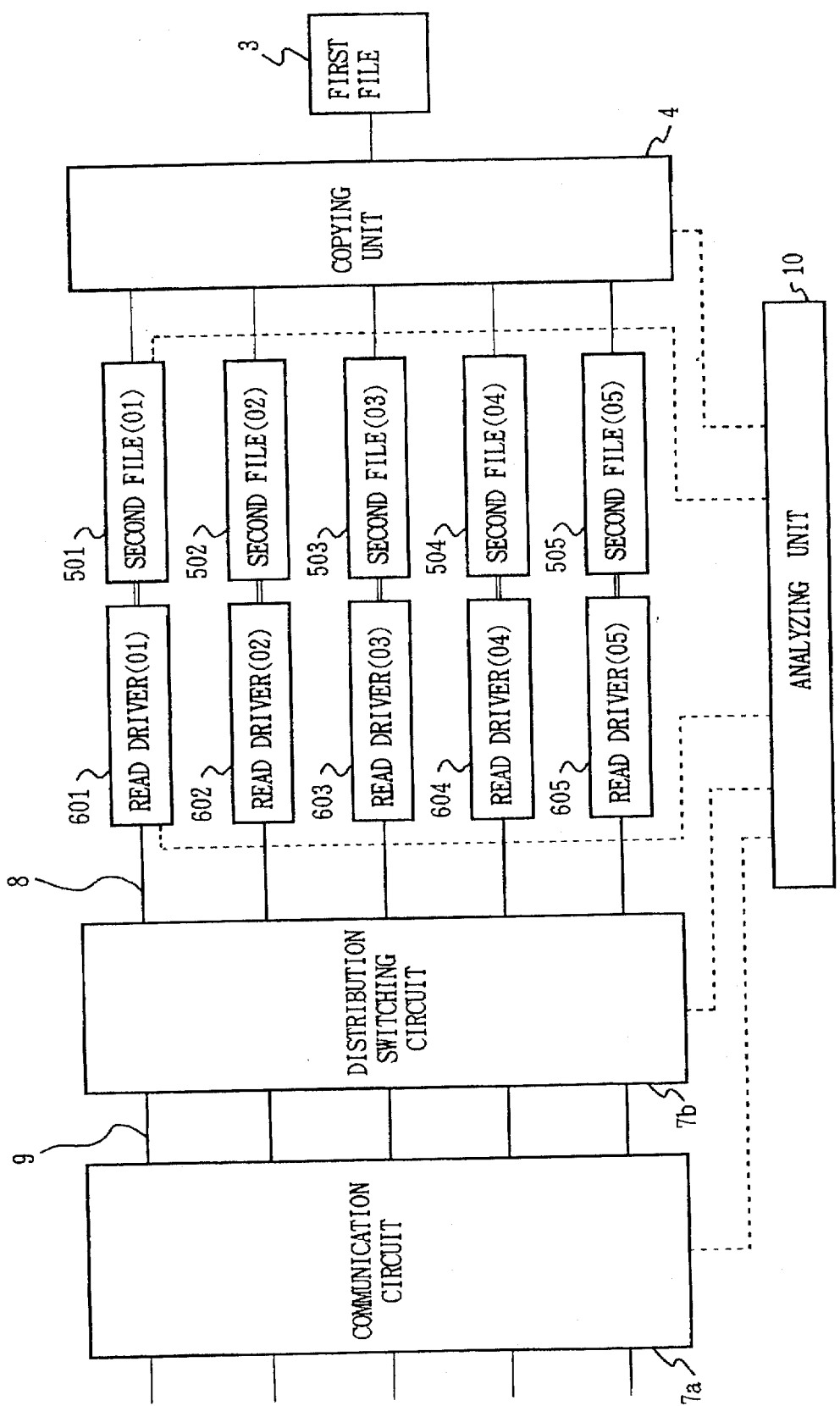
FIG. 4 is a block diagram showing the picture distributing system of the embodiment 3, which is illustrated in a functionally-separated structure.

The function of the picture supply device 2 will be hereunder described with reference to FIG. 4.

The picture supply device 2 of the embodiment 3 includes a first file 3 for storing plural picture sources, a copying circuit 4 for copying the picture sources of the first file 3 to second files 501 to 505, read drivers 601 to 605 for reading out the picture sources of the second files 501 to 505, a distribution switching circuit 7b for connecting output lines 8 extending from the read drivers 601 to 605 to subscriber circuits 9 which are connected to destination sides, and a communication circuit 7a for transmitting picture sources read out by the read drivers 601 to 605 to the subscriber terminals 1 serving as the destination sides. In this embodiment 3, five second files (01)501 to (05)505 are provided, and each of the read drivers (01)601 to (05)605 is provided in correspondence with each second file.

Figure 5:
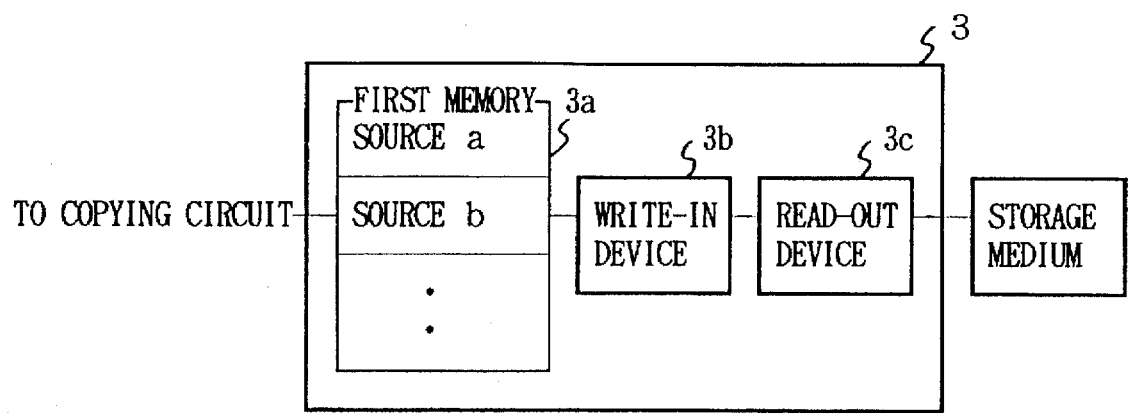
FIG. 5 is a block diagram showing the inner construction of a first file of the embodiment 3.

As shown in FIG. 5, the first file 3 has a first memory 3a for storing various kinds of picture sources such as movies, music, etc., and has a write-in device 3b and a read-out device 3c which serve as a mechanism for storing a new picture source in the first memory 3a.

The read-out device 3c serves to read out picture sources which are stored on a storage medium such as an optical disc, a magnetic disc, a magnetic tape or the like. The write-in device 3b serves to write the picture source read out by the read-out device 3c into the first memory 3a (see FIG. 5).

Figure 6:
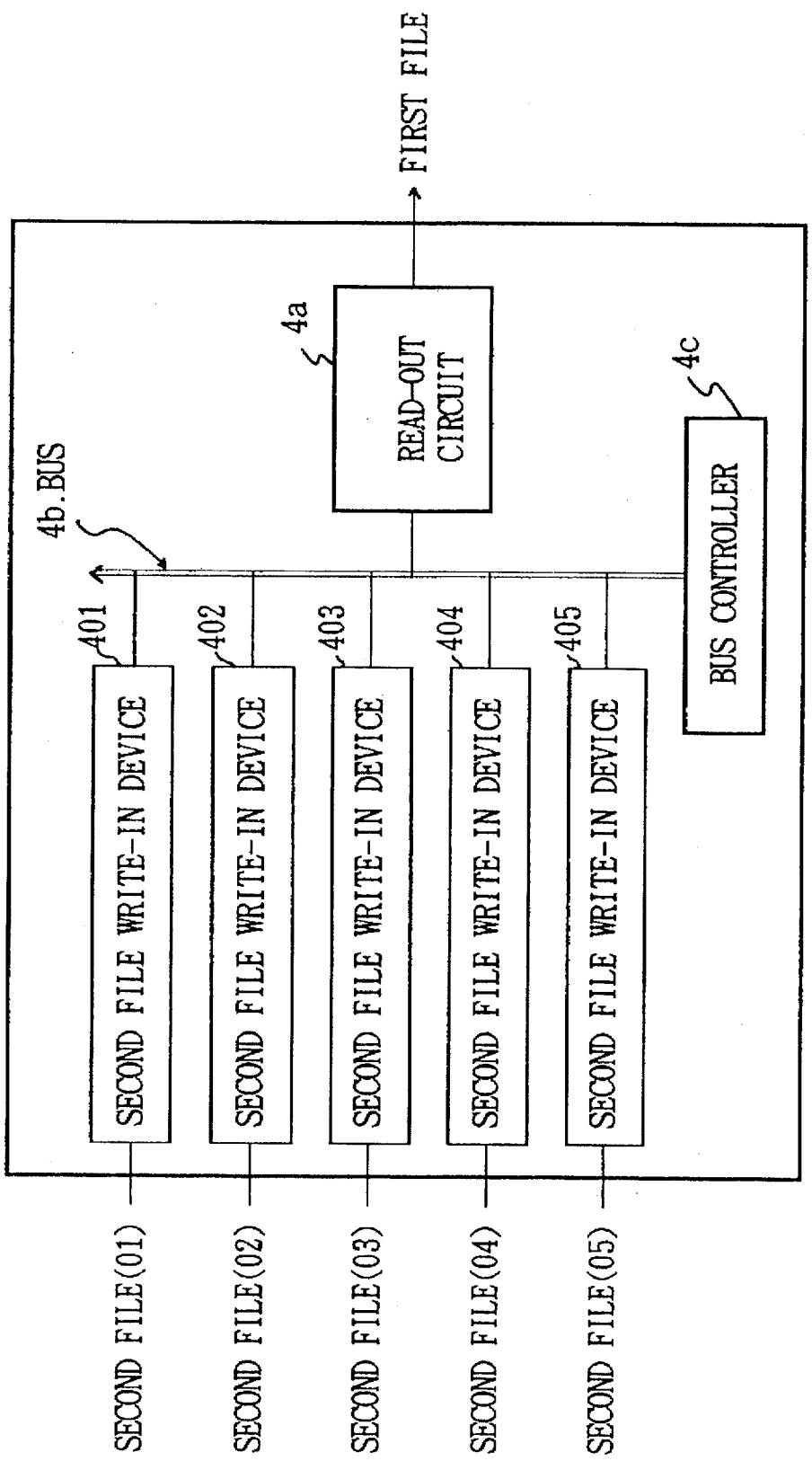
FIG. 6 is a block diagram showing the inner construction of a copying circuit of the embodiment 3.

Next, the inner construction of the copying circuit 4 will be described with reference to FIG. 6.

The copying circuit 4 of the embodiment 3 includes a read-out circuit 4a for reading out a prescribed picture source from the first file 3, and second file write-in devices (01)401 to (05)405 for writing the picture sources read out by the read-out circuit 4a into the second files (01)501 to (02)505. The second file write-in devices (01)401 to (05)405 are provided in correspondence with the respective second files, and thus five second file write-in devices (01)401 to (05)405 are provided totally.

The second file write-in devices (01)401 to (05)405 and the read-out circuit 4a are connected to each other through a bus 4b, and a picture source read out by the read-out circuit 4a is transmitted to a prescribed second file write-in device (01)401 to (05)405 through the control of a bus controller 4c.

The distribution switching circuit 7b has a function of transmitting a picture source read out by a read driver (01)601 to (05)605 to a subscriber circuit. The construction of the distribution switching circuit 7b will be described with reference to FIG. 7.

That is, the distribution switching circuit 7b of this embodiment includes an input terminal switching unit 70, a predetermined number of distribution circuits and an output terminal switching unit 72.

The input terminal switching unit 70 serves to connect or disconnect the output lines 8 of the read driver (01)601 to (05)605 to or from prescribed distribution circuits 71.

The distribution circuit 71 has a function of copying a single picture source to a predetermined number of picture sources. Specifically, it has copy units which are connected at a two-stage connection structure, and serve to copy an input picture source to three picture sources and output the copied three picture sources therefrom. With this construction, each distribution circuit 71 can distribute a single picture source to subscriber circuits 9 of nine at maximum.

The output terminal switching unit 72 has a function of connecting the output of a distribution circuit 71 to a prescribed subscriber circuit 9. The communication circuit 7a has a function of transmitting and receiving information to and from a subscriber terminal 1, and it serves to receive a call from the subscriber terminal 1, receive a picture-source supply demand and transmit a picture source.

A state managing unit 10 is an embodiment of the analyzing means according to this invention, and in more detail it is a device which is realized by a program and CPU. The state managing unit 10 has a function of identifying an address in the first file 3 of a picture source demanded by a subscriber, identify empty second files (01)501 to (05)505, issuance of a read-out command to the read drivers (01)601 to (05)605, a distribution instruction to the distribution circuit 7b, and issuance of a connection instruction between the output line 8 and the subscriber circuit 9.

Next, the operation of the picture supply device 2 of the embodiment 3 will be described with reference to FIG. 8.

Figure 8:
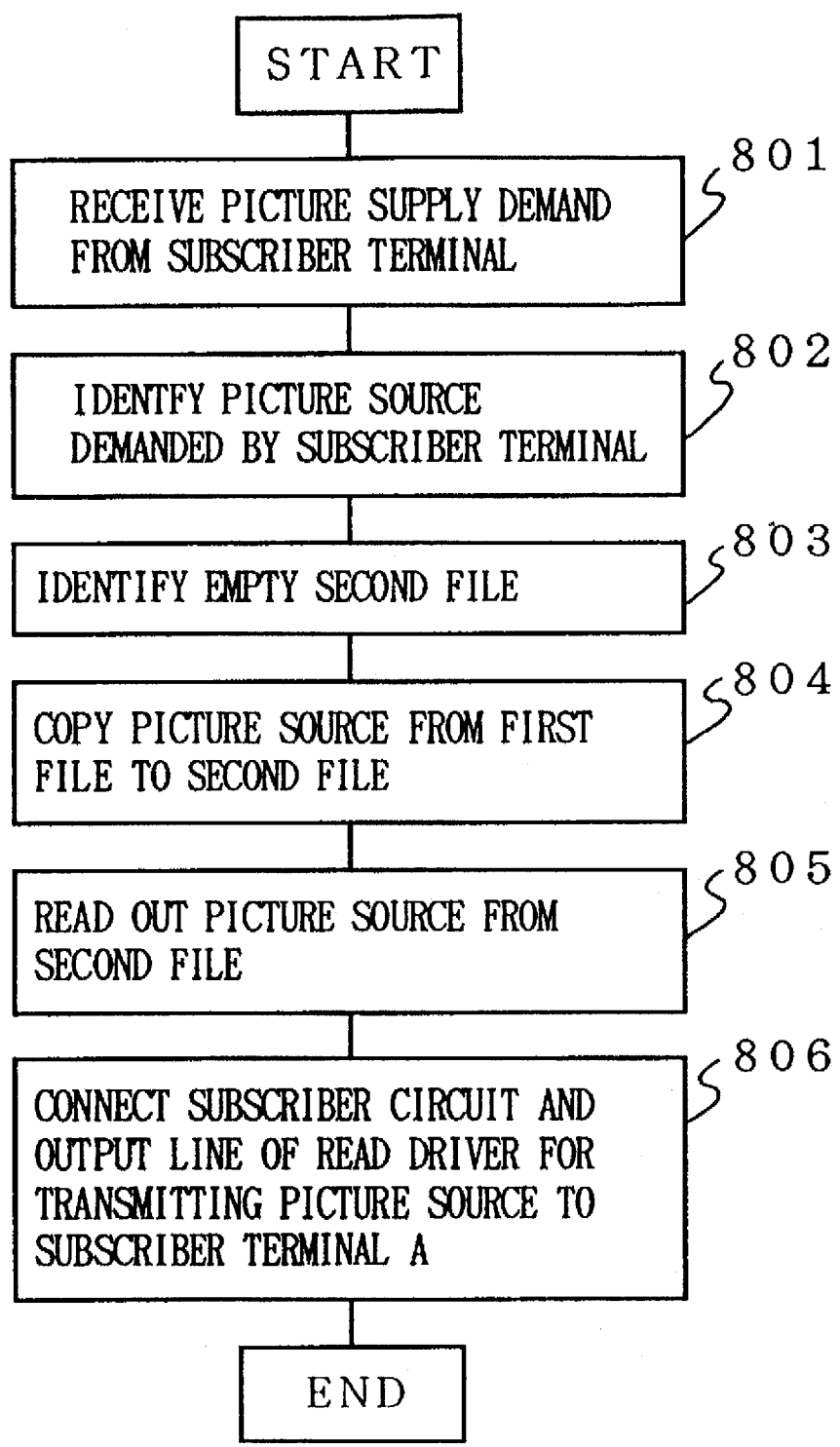
FIG. 8 is a flowchart (1) showing an operation flow of the picture supply device of the embodiment 3.

FIG. 8 is a flowchart showing an operation flow of the picture supply device 2 when receiving a supply demand for a picture source a from a subscriber terminal A(1a).

When the subscriber terminal A(1a) makes a call to the picture supply device 2 and receives a call-reception notification, it transmits the supply demand for the picture source a.

In the picture supply device 2, the communication circuit 7a receives the call and receives a picture supply demand. Thereafter, the communication circuit 7a notifies the state managing means 10 of the subscriber circuit 9 connected to the subscriber terminal A(1a), and transmits the picture supply demand as described above (step 801).

When receiving identification information of the subscriber circuit 9 and the picture supply demand, the state managing unit 10 analyzes the picture supply demand to recognize the picture source a demanded by the subscriber terminal A(1a) and identify the address in the first file 3 for the picture source a (step 802). Further, the state managing unit 10 refers to the use state of the second files (01)501 to (05)505 to identify empty second files (01)501 to (05)505 (step 803). Thereafter, the state managing unit 10 notifies the copying circuit 4 of the address information and the empty second files (01)501 to (05)505.

In the copying circuit 4, the read-out circuit 4a accesses the first file 3 to read out the picture source a stored at the address as described above. At this time, the bus controller 4c transmits the picture source a read out by the read-out circuit 4a to a second file write-in device (01)401 to (05)405 corresponding to one of the second files (01)501 to (05)505 which is indicated by the state managing unit 10. The second file write-in device (01)401 to (05)405 writes the picture source a read out by the read-out circuit 4a to the second file (01)501 to (05)505 (step 804).

Subsequently, the state managing unit 10 instructs one of the read drivers (01)601 to (05)605 to perform an read-out operation from the second file (01)501 to (05)505, and at the same time it instructs the distribution switching circuit 7b to connect the output line 8 from the read driver (01)601 to (05)605 and the subscriber circuit 9 to each other. The read driver (01)601 to (05)605 successively reads out the picture source a written in the second file (01)501 to (05)505 (step 805).

On the other hand, in the distribution switching circuit 7b, the input terminal switching unit 70 connects the output line 8 to an empty distribution circuit 71, and at the same time the output terminal switching unit 72 connects the distribution circuit 71 to the subscriber circuit 9. The distribution switching circuit 7b outputs the picture source a transmitted on the output line 8 to the output terminal switching unit 72 without copying and distributing the picture source a. Through this operation, the picture source is output to the subscriber circuit 9 through the output terminal switching unit 72, and input to the communication circuit 7a. The communication circuit 7a transmits the picture source to the subscriber terminal A(1a) (step 806).

Here, in the case where during transmitting the picture source a to the subscriber terminal A(1a), a supply demand for the picture source a is made from a subscriber terminal B(1b), the communication circuit 7a receives the picture supply demand from the subscriber terminal B(1b), and notifies the state managing unit 10 of the subscriber circuit connected to the subscriber terminal B(1b) while transmitting the picture supply demand thereto.

The state managing unit 10 analyzes the picture supply demand to recognize the picture source a demanded by the subscriber terminal B(1b) and identify the address in the first file 3 for the picture source a. Further, the state managing unit 10 refers to the use state of the second files (01)501 to (05)505, and identifies those second files (01)501 to (05)505 which are different from the second file (01)501 to (05)505 used for the transmission to the subscriber terminal A(1a) and are in an empty state. Thereafter, the state managing unit 10 notifies the copying circuit 4 of the address information and the empty second files (01)501 to (05)505.

In the copying circuit 4, the read-out circuit 4a accesses the first file 3 to read out the picture source a stored at the address. At this time, the bus controller 4c controls a transmission path of the bus 4b to transmit the picture source read out by the read-out circuit 4a to one of the second file write-in devices (01)401 to (05)405 which corresponds to one of the empty second files (01)501 to (05)505 indicated by the state managing unit 10.

The second file write-in device (01)401 to (-05)405 writes the picture source a read out by the read-out circuit 4a to the second file (01)501 to (05)505.

Subsequently, the state managing unit 10 instructs one of the read drivers (01)601 to (05)605 corresponding to the second file (01)501 to (05)505 to carry out the read-out operation from the second file (01)501 to (05)505, and at the same time instructs the distribution switching circuit 7b to connect the output line 8 of the read driver (01)601 to (05)605 and the subscriber circuit 9 as described above.

The read driver (01)601 to (05)605 successively read out the picture source a written in the second file (01)501 to (05)505.

On the other hand, in the distribution switching circuit 7b, the input terminal switching unit 70 connects the output line 8 to the empty distribution circuit 71, and at the same time the output terminal switching unit 72 connects the distribution circuit 71 to the subscriber circuit 9. The distribution switching circuit 7b outputs the picture source a to the output terminal switching unit 72 without copying and distributing the picture source a transmitted on the output line 8. Through this operation, the picture source is output to the subscriber circuit 9 through the output terminal switching unit 72, and input to the communication circuit 7a.

The communication circuit 7a transmits the picture source a to the subscriber terminal B(1b). Accordingly, even when a supply demand for the picture source a which is being transmitted is made, the picture source is supplied to subscribers without keeping the subscribes waiting.

Figure 9:
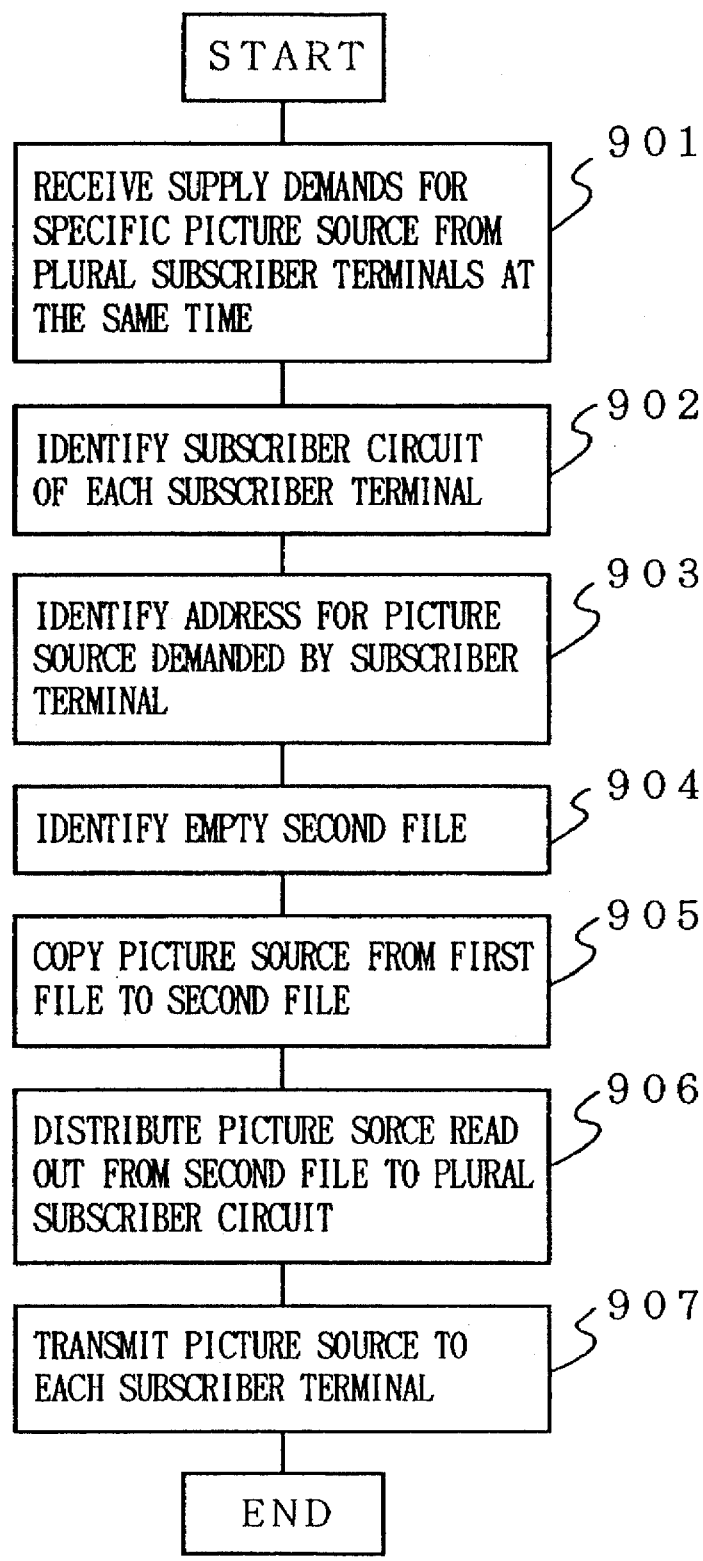
FIG. 9 is a flowchart (2) showing an operation flow of the picture supply device of the embodiment 3.

Next, the operation flow of the picture supply device 2 when the supply demand for a prescribed picture source is made from plural subscriber terminals 1 at the same time will be described with reference to a flowchart of FIG. 9.

When receiving the picture supply demand from the plural subscriber terminals 1 at the same time, the communication circuit 7a notifies the state managing unit 10 of the subscriber circuits 9 connected to the respective subscriber terminals 1, and transmits the picture supply demand from each subscriber terminal 1.

The state managing unit 10 analyzes the picture supply demand from each subscriber terminal 1 to identify a picture source demanded by each subscriber terminal 1, and recognizes that the picture source a is demanded by all the subscriber terminals 1. Subsequently, the state managing unit 10 identifies an address in the first file 3 for the picture source a, and selects one of empty second files (01)501 to (05)505.

The state managing unit 10 further notifies the copying circuit 4 of the address and the empty second file (01)501 to (05)505.

At this time, in the copying circuit 4, the read-out circuit 4a accesses the first file 3 to read out the picture source a stored at the address. Further, the bus controller 4c controls the transmission path of the bus 4b to transmit the picture source a to the second file write-in device (01)401 to (05)405 which corresponds to the second file (01)501 to (05)505 indicated by the state managing unit 10.

The second file write-in circuit (01)401 to (05)405 writes the picture source a read out by the read-out circuit 4a into the second file (01)501 to (05)505.

At this time, the state managing unit 10 issues a read-out command of the picture source to the read driver (01)601 to (05)605 corresponding to the second file (01)501 to (.05) 505, and issues a connection command between the subscriber circuit 9 of each subscriber terminal 1 and the output line 8 of the read driver (01)601 to (05) 605.

In the distribution switching circuit 7b, the input terminal switching unit 70 connects the output line 8 and an empty distribution circuit 71 to each other. At the same time, the output terminal switching unit 72 connects the distribution circuit 71 and the subscriber circuits 9.

Subsequently, in the distribution circuit 71, using the plural copy units 71a of the distribution circuit 71, the picture source a which is read out by the read driver (01)601 to (05)605 is copied into plural picture sources whose number is equal to the number of the subscriber circuits, and output to a prescribed output terminal.

The communication circuit 7a transmits the plural picture sources output from the output terminal to the respective subscriber terminals 1.

Figure 7:
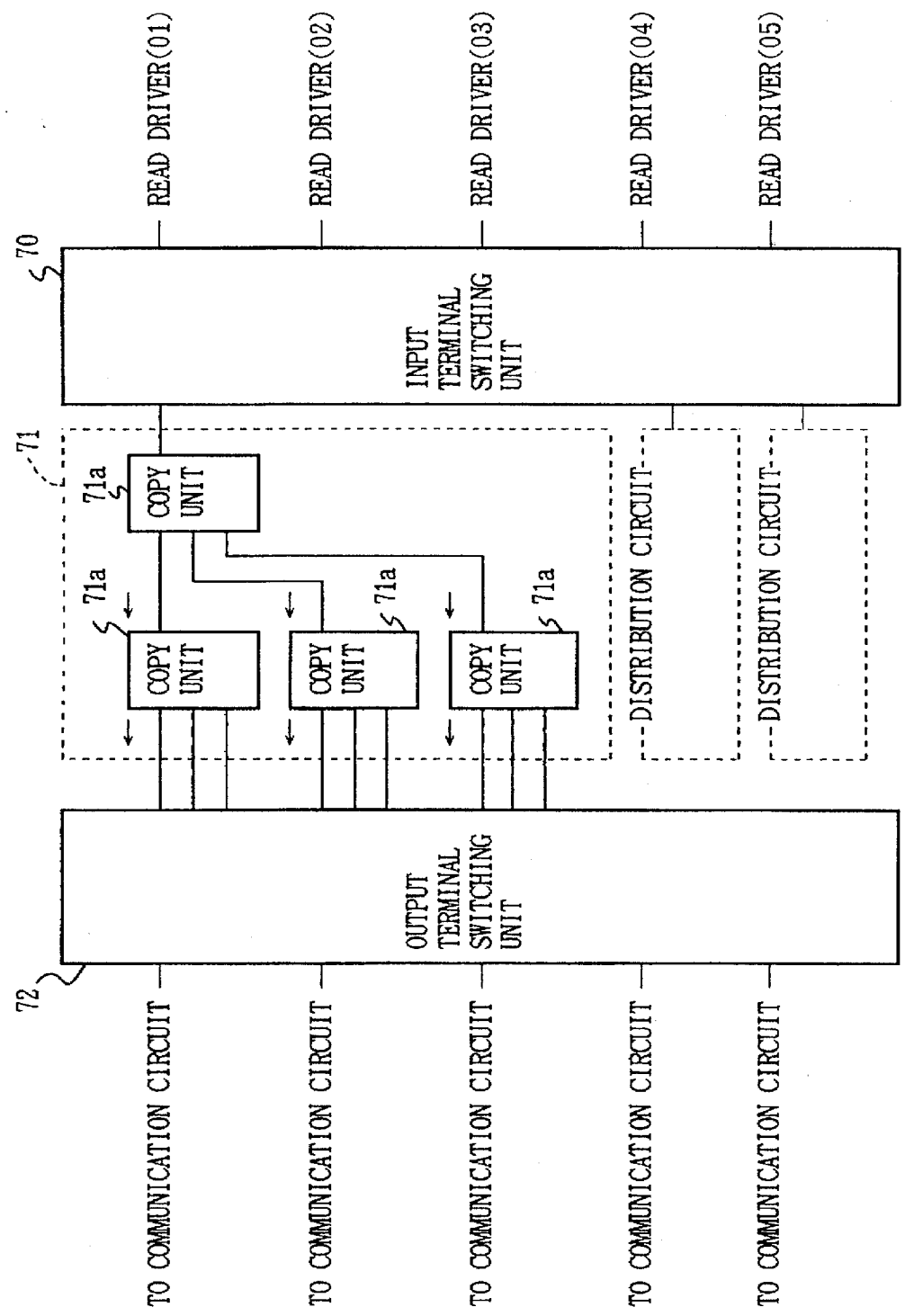
FIG. 7 is a block diagram showing the inner construction of a distributing switch circuit 7b of the embodiment 3.

In this case, a single picture source can be copied into nine picture sources in a distribution circuit 71 as shown in FIG. 7. When the supply demand for the picture source a is made from ten or more subscriber terminals 1 at the same time, the state managing unit 10 selects two empty second files, for example, second files (01)501 and (02)502.

In this case, the copying circuit 4 copies the picture source a rad out from the first file 3 to the second files (01)501 and (02)502.

The read drivers (01)601 and (02)602 corresponding to the second files (01)501 and the (02)502 read out the picture sources a which are written in the second files (01)501 and (02)502, and transmits them to the distribution switching circuit 7b.

In the distribution switching circuit 7b, the input terminal switching unit 70 connects the output lines 8 of the read drivers (01)601 and (02)602 to distribution circuits 71.

The distribution circuit 71 which is connected to the output line 8 of the read driver (01)601 copies the picture source a read out by the read driver (01)601 into nine picture sources a through the plural copy units 71a, and outputs them to nine output terminals.

On the other hand, the distribution circuit 71 which is connected to the output line 8 of the read driver (02)602 also copies the picture source a read out by the read driver (02)602 into nine picture sources a through the plural copy units 71a, and outputs them to nine output terminals.

With this construction, a single picture source can be distributed to a larger number of subscriber terminals 1.

Further, when the supply demand for a single picture source is made from 18 or more subscriber terminals 1, the picture source is copied to three second files (01)501 to (05)505, and the picture sources may be distributed from each of the second files (01)501 to (05)505.

According to the embodiment 3, by designing files in a hierarchical structure, a single picture source can be supplied to a larger number of subscriber terminals at the same time, and a picture source under transmission can be supplied to other subscriber terminals 1 without keeping the subscriber terminals waiting.

EMBODIMENT 4

Figure 10:
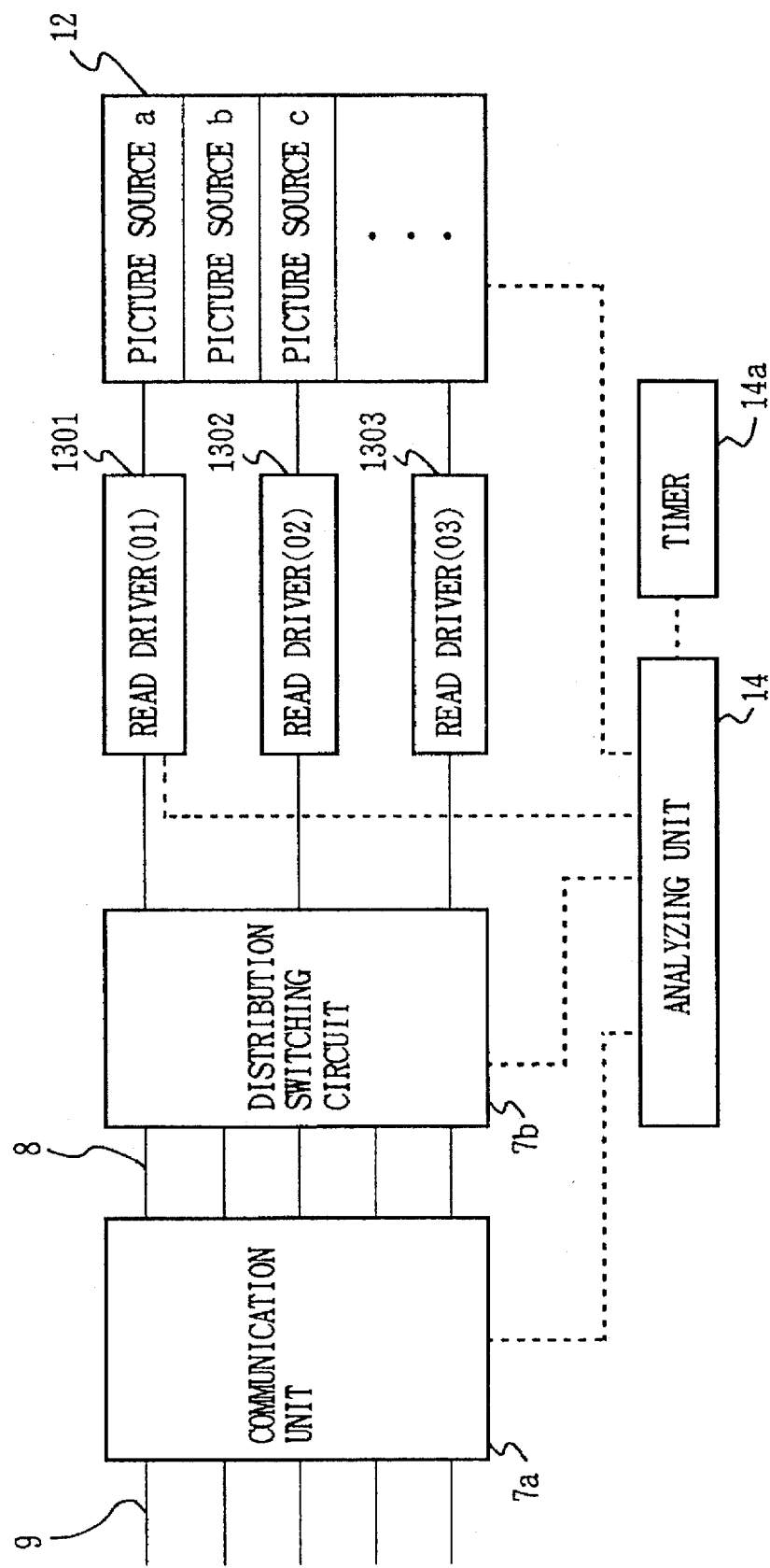
FIG. 10 is a block diagram showing a picture supply device of an embodiment 4, which is illustrated in a functionally separated structure.

The picture supply device 2 of the embodiment 4 is shown in FIG. 10.

The picture supply device 2 of the embodiment 4 includes a communication circuit 7a, a distribution switching circuit 7b, three read drivers (01)1301 to (03)1303, files 12 and a state managing unit 14.

The communication circuit 7a has a function of transmitting and receiving information to and from subscriber terminals 1 like the embodiment 3.

Like the embodiment 3, the distribution switching circuit 7b has a function of connecting the output lines 8 of the read drivers (01)1301 to (03)1303 and the subscriber circuits 9 to one another, and a function of copying a single picture source to a predetermined number of picture sources.

Each of the read drivers (01)1301 to (03)1303 has a function of reading out a picture source indicated by the state managing unit 14 from a file 12.

The state managing unit 14 has a function of identifying an address in the file for a picture source demanded by a subscriber terminal 1, a function of issuing a read-out command of the picture source to an empty read driver (01)1301 to (03)1303, a function of issuing a connection command between the output line 8 of the read driver (01)1301 to (03)1303 and the subscriber circuit 9 to each other, and a function of issuing a transmission command of the picture source to the communication circuit 7a. Further, the state managing unit 14 of this embodiment 4 is actuated when a first supply demand for a picture source is made, and includes a timer for counting a specific time. The state managing unit 14 executes the following procedure when receiving a first supply demand for a picture source a.

(1) a step of actuating the timer 14a, and at the same time identifying an address in a file 12 for the picture source a, (2) a step of ensuring a read driver (01)1301 to (03)1303 in an empty state, (3) a step of ensuring a connection path between the output line of the read and the (01)1301 to (03)1303 and the subscriber circuit 9 of the subscriber terminal 1 in a distribution switching circuit 7b, and (4) a step of ensuring a connection path between the output line of the read driver (01)1301 to (03)1303, the subscriber terminal 1 and the other subscriber terminal 1.

Further, when receiving the supply demand for the picture source within the specific time, the step 4 as described above is repetitively executed, and when the time count of the specific time is completed, the following steps are successively executed: (5) a step of issuing a rad-out command of the picture source to the read driver (01)1301 to (03)1303, (6) a step of issuing to the distribution switch circuit 7b a connection command between the output line 9 between the read driver (01)1301 to (03)1303 and the subscriber-side circuit 9 of the subscriber terminal 1 which makes a demand within the specific time, and a distribution command of the picture source, and (7) a step of issuing a transmission command of the picture source to the communication circuit 7a.

Figure 11:
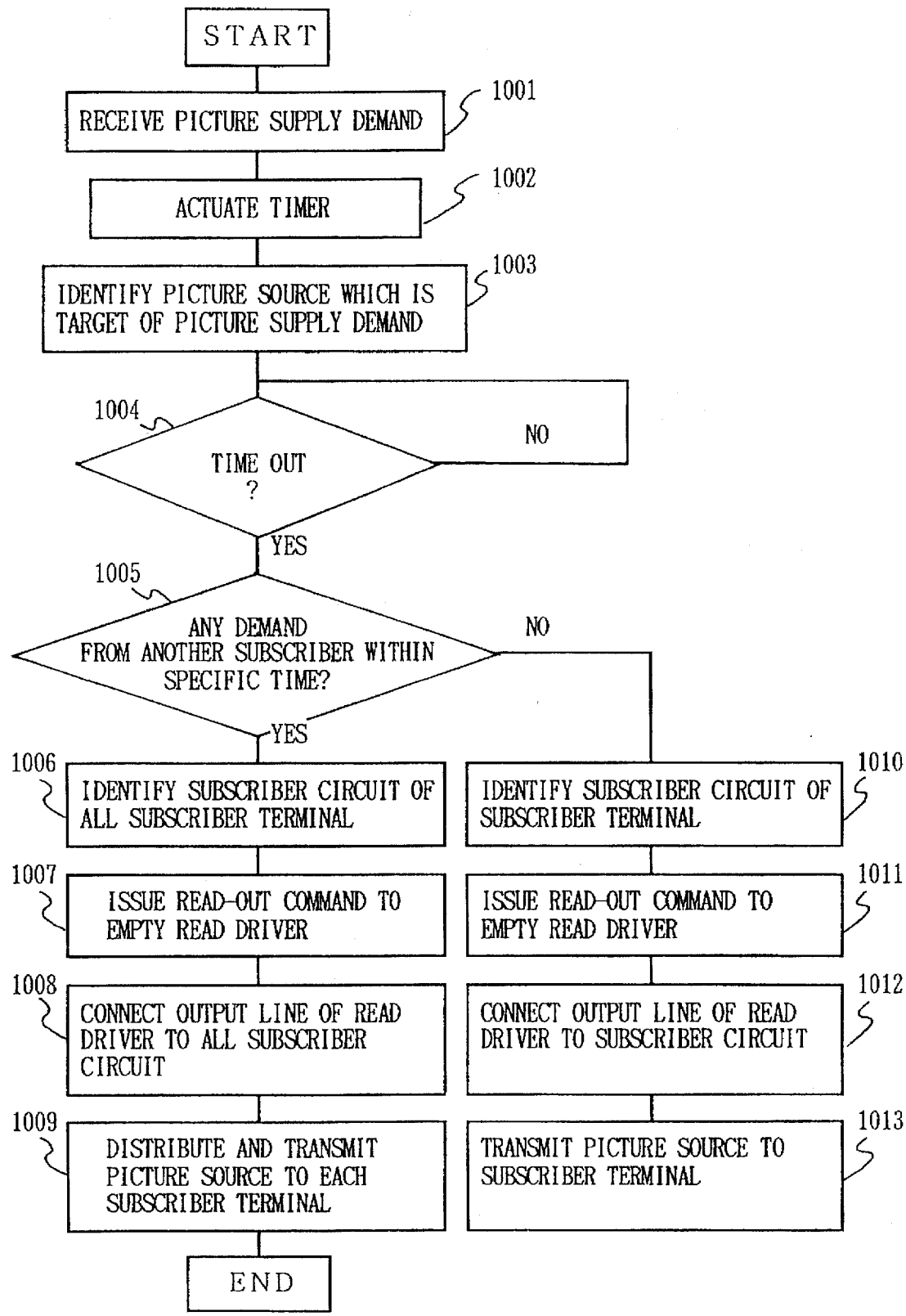
FIG. 11 is a flowchart showing an operation flow of the picture supply device of the embodiment 4.
Figure 12:
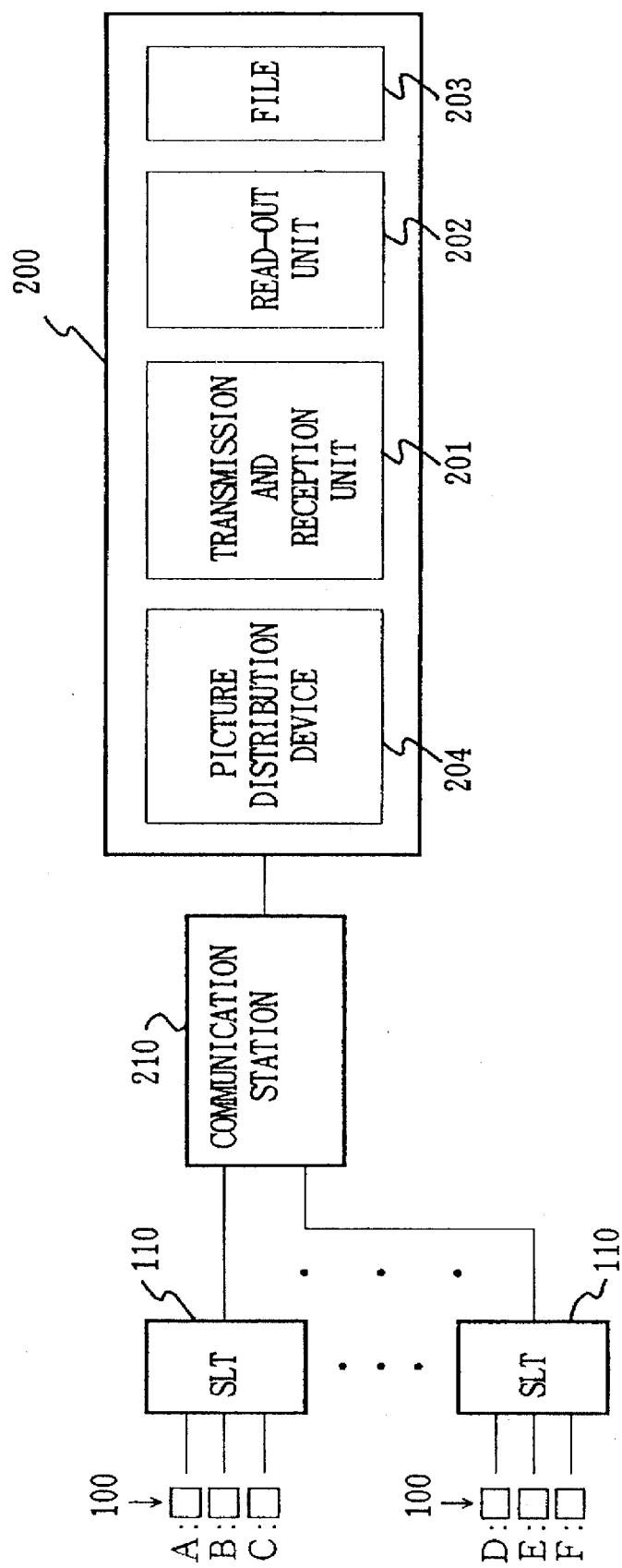
FIG. 12 is a block diagram showing a conventional video data distributing system, which is illustrated in a functionally separated structure.

The operation flow of the picture supply device 2 of the embodiment 4 will be described with reference to a flowchart of FIG. 11.

When a subscriber terminal A(1a) makes a call to the picture supply device 2 and this call is received by the device, the subscriber terminal transmits a supply demand for a picture source a. At this time, in the picture supply device 2, the communication circuit 7a makes a call, and receives a picture supply demand (step 1001).

Subsequently, the communication circuit 7a notifies the state managing unit 14 of the subscriber circuit 8 connected to the subscriber terminal A(1a), and transmits the picture supply demand to the state managing unit 14.

When receiving the picture source demand, the state managing unit 14 actuates the timer 14a (step 1002), and analyzes the picture supply demand to recognize the picture source a demanded by the subscriber terminal A(1a) (step 1003) and identify the address in the file 12 for the picture source a.

Subsequently, at the time when the timer 14a completes a time count of a specific time (step 1004), the state managing unit 14 judges whether a supply demand for the picture source a is also received from another subscriber terminal 1 within the specific time (step 1005). If the supply demand for the picture source a from another subscriber terminal 1 is received, the state managing unit 14 identifies the subscriber circuit 8 connected to this subscriber terminal 1 (step 1006), and notifies one of empty read drivers (01)1301 to (02)1302 of the address of the picture source a and the read command (step 1007). Further, the state managing unit 14 instructs the distribution switching circuit 7b to connect the output line 8 of the read driver (01)1301 to (03)1303 to both of the subscriber circuit 9 connected to the subscriber terminal A(1a) and the subscriber circuit 8 of the other subscriber terminal 1 (step 1009).

First, the read driver (01)1301 to (03)1303 accesses the file 12, and reads out the picture source a stored at the address as described above.

On the other hand, in the distribution switching circuit 7b, the output line of the read driver (01)1301 to (03)1303 is connected to the subscriber circuit 9 of the subscriber terminal A(1a), and also connected to the subscriber circuit 9 of the other subscriber terminal 1 (step 1009). Subsequently, the distribution circuit 71 copies the picture source a, and the communication circuit 7a transmits the copied picture sources to the respective subscriber terminals 1 (step 1010).

In a case where in the step 1005 the state managing unit 14 receives no supply demand for the picture source a from another subscriber terminal B(1b) (or subscriber terminal C(1c)) within the specific time, that is, it receives the supply demand for the picture source a from only the subscriber terminal A(1a), it recognizes the subscriber circuit 9 connected to the subscriber terminal A(1a) (step 1011), and notifies an empty read driver (01)1301 to (03)1303 of the address of the picture source a and the read-out command (step 1012).

Subsequently, the state managing unit 14 issues to the distribution switching circuit 7b the connection command between the output line 8 of the read driver (01)1301 to (03)1303 and the subscriber circuit 9 of the subscriber terminal A(1a).

In the distribution switching circuit 7b, the output line of the read driver (0191301 to (03)1303 is connected to the subscriber circuit 9 of the subscriber terminal A(1a) (step 1014), and the picture source a is output to the subscriber circuit 9 of the subscriber terminal A(1a) without being copied. Thereafter, the communication circuit 7a transmits the picture source a output from the distribution switching circuit 7b to the subscriber terminal A(1a) (step 1015).

According to the embodiment 4, the transmission of the picture source is started after a specific time elapses from reception of a first picture supply demand for a picture source, and thus if the supply demand from the picture source is received from other subscriber terminals within the specific time, the picture source can be supplied to these subscriber terminals, and thus the picture source can be supplied to a larger number of subscribers.

In this embodiment 4, a commercial message or supply information on picture sources may be transmitted to subscriber terminals 1 within the specific time.

Further, the specific time counted by the timer 14a may be freely altered in accordance with each picture source. In this case, the specific time may be set to be shorter for picture sources for which a larger number of subscribers make supply demands, and set to be longer for picture sources for which a smaller number of subscribers make supply demands. The setting of the specific time may be freely altered by a maintainer of the picture supply device, or may be automatically altered in the device. When the specific time is altered in the device, the state managing unit 14 successively executes the following steps: (10) a step of counting the number of supply demands for each picture source within a fixed time,

(20) a step of comparing the count value obtained at the step (10) with the count value obtained just before this count operation, and

(30) a step of altering the specific time on the basis of the comparison result of the step (20).

At the step (30), the specific time would be set to be shorter if the count value at the step (20) exceeds the count value obtained just before, while set to be longer if the count value at the step (20) is lower than the count value just before. Further, the longest (threshold) time may be set for a set range of the specific time. When the longest time is set, a step of judging whether a specific time for which the longest time is set is shorter than the longest time, and a step of setting the longest time as a specific time when the specific time exceeds the longest time are required to be executed. The specific time may be incremented or decremented every one minute, three-minutes, five-minutes or the like.

Still further, in the embodiment 4, a charge for picture supply may be altered in accordance with a standby time. For example, for a subscriber waiting for a longer time, the charge may be set to be lower while for a subscriber waiting for a shorter time, the charge is set to be higher.

The timer function of the Embodiment 4 may be equipped to the state managing unit 10 of the embodiment 3. With this construction, a picture source can be transmitted to a larger number of subscribers by a single transmission processing.

What is claimed is:

1. A picture distribution method for a picture supply device which comprises a first file for storing plural kinds of picture sources and plural second files for temporarily storing picture sources, and is connected to a network, comprising the steps of:

determining a particular address in the first file for a picture source demanded by a first subscriber terminal when a supply demand for the picture source is made from the first subscriber terminal;

determining a particular empty second file in the plural second files;

first identifying a first subscriber circuit which is connected to the first subscriber terminal;

first copying the picture source at the address determined at said address determining step into the empty second file which is determined at said empty second file determining step;

first reading out the picture source copied at said first copying step from said second file;

first transmitting the picture source read out at said first reading out step to the first subscriber circuit determining another particular empty second file in the plural second files when a supply demand for the picture source is made from a second subscriber terminal during transmission of the picture source to the first subscriber terminal;

second identifying second subscriber circuit which is connected to the second subscriber terminal;

second copying the picture source stored at the address determined at said address determining into the another empty second file which is determined at said another empty second file determining step;

second reading out the picture source copied at said second copying step from said another second file; and second transmitting the picture source read out at said second reading out step to the second subscriber circuit.

2. The picture distribution method as claimed in claim 1, wherein when the picture supply device receives supply demands for the same picture source from plural subscriber terminals at the same time, said first or said second subscriber circuit identifying step comprises the step of identifying subscriber circuits which are connected to the subscriber terminals respectively; and said first or said second transmitting step comprises the step of distributing and transmitting the picture source read out at said first or second read-out step to the subscriber circuits.

3. The picture distribution method as claimed in claim 1, wherein the transmission of the picture source is started at a time which the first or second subscriber terminal indicates.

4. A picture distribution device having a picture supply device which is connected to a network and serves to supply desired picture sources to plural subscriber terminals, comprising:

a first file for storing plural kinds of picture sources;

plural second files for temporarily storing the picture sources;

first analyzing means for analyzing a first supply demand for the picture source received from a first subscriber terminal to identify an address in the first file for the picture source demanded by the first subscriber terminal, to identify an empty second file in the plural second files and to identify a first subscriber circuit connected to the first subscriber terminal;

first copying means for reading out the picture source at the address identified by said first analyzing means and writing the read-out picture source into the empty second file;

first read-out means for reading out the picture source copied in the second file;

first transmitting means for connecting the first subscriber circuit identified by said first analyzing means to the output line of said first read-out means to transmit the picture source to the first subscriber terminal;

second analyzing means for analyzing a second supply demand for the picture source when the second supply demand for the picture source is received from a second subscriber terminal during the transmission of the picture source to the first subscriber terminal in order to identify another empty second file in the plural second files and to identify a second subscriber circuit connected to the second subscriber terminal;

second copying means for reading out the picture source at the address identified by said first analyzing means and writing the read-out picture source into the another empty second file;

second read-out means for reading out the picture source copied in the another second file; and second transmitting means for connecting the second subscriber circuit identified by said second analzying means to the output line of said second read-out means to transmit the picture source to the second subscriber terminal.

5. The picture distribution device as claimed in claim 4, wherein when the picture supply device receives supply demands for the same picture source from plural subscriber terminals at the same time, said first or second analyzing means identifies the subscriber circuits connected to each of the subscriber terminals respectively, and said first or second transmitting means connects the subscriber circuits identified by said first or second analyzing means to the output line of said first or second read-out means, in order to distribute and transmit the picture source to the subscriber terminals.

6. The picture distribution device as claimed in claim 4, wherein the transmission of the picture source is started at a time which the first or second subscriber terminal indicates.

* * * * *